Sept. 26, 1933.　　　　J. R. WARREN　　　　1,928,159
MEANS FOR SHAPING HELICAL BODIES
Filed Feb. 12, 1932　　　8 Sheets-Sheet 1

Fig. 1.

Witness:
Geo L. Chapel

Inventor
John R. Warren
By Rice and Rice
Attorneys

Sept. 26, 1933.  J. R. WARREN  1,928,159
MEANS FOR SHAPING HELICAL BODIES
Filed Feb. 12, 1932  8 Sheets-Sheet 2

Witness:
Geo. L. Chapel

Inventor
John R. Warren
By Rice and Rice
Attorneys

Sept. 26, 1933.   J. R. WARREN   1,928,159
MEANS FOR SHAPING HELICAL BODIES
Filed Feb. 12, 1932   8 Sheets-Sheet 3

Witness:
Geo L. Chapel

Inventor
John R. Warren
By Rice and Rice
Attorneys

Sept. 26, 1933.    J. R. WARREN    1,928,159
MEANS FOR SHAPING HELICAL BODIES
Filed Feb. 12, 1932    8 Sheets-Sheet 6

Witness:
Geo. L. Chapel

Inventor
John R. Warren
By Rice and Rice
Attorneys

Sept. 26, 1933.  J. R. WARREN  1,928,159
MEANS FOR SHAPING HELICAL BODIES
Filed Feb. 12, 1932   8 Sheets-Sheet 8

Inventor
John R. Warren
By Rice and Rice
Attorneys

Witness:
Geo. L. Chapes

Patented Sept. 26, 1933

1,928,159

UNITED STATES PATENT OFFICE 1,928,159

MEANS FOR SHAPING HELICAL BODIES

John R. Warren, Grand Rapids, Mich., assignor to Charles R. Evenson and James A. Webber, both of Grand Rapids, Mich., doing business as Michigan Wheel Co.

Application February 12, 1932. Serial No. 592,628

8 Claims. (Cl. 90—31)

The present invention relates to machines for shaping or milling bodies helically; and its object is, generally, to provide such a machine improved in respects hereinafter appearing; and further, to provide such a machine having the improved mode of operation hereinafter described; and further, to provide such a machine effecting the improved results herein set forth; and more particularly, to provide such a machine whereby the said body is turned about its axis relatively to a tool being moved parallelly with said axis in successive cutting operations winding helically about said axis; and further, to provide in such a machine means for progressively inclining the tool relatively to a plane at right angles to said axis; and further, to provide in such a machine means for moving the tool radially of said axis between its several cutting operations; and further, to provide in such a machine oscillating means for turning said body and for moving the tool; and further, to provide in such a machine means for shaping oppositely winding helixes; and further, to provide in such a machine, specific means and mechanisms for effecting such results.

These and any other and more specific objects hereinafter appearing are attained by, and the invention finds preferable embodiment in, the machine particularly described in the body of this specification and illustrated by the accompanying drawings, in which:

In the embodiment of the invention illustrated by these drawings a machine for shaping or milling helical bodies, as screw propellers for boats, is shown comprising a suitable base frame on which are mounted a turnable work carrier and a cutting tool with means for moving the same relatively to the work carrier.

In the operation of this machine such a work piece is turned by said carrier relatively to the tool while the same is being fed parallelly with the axis of the carrier's turning movement to effect each of the tool's successive operations which form cuts winding helically about said axis, and after such a cutting operation the parts are returned and the tool is moved radially of said axis and is inclined relatively to a plane at right angles thereto preparatory to the next cutting operation.

These movements of the parts are effected by suitable mechanism, preferably such as is illustrated by the drawings and operating in the manner hereinafter described.

Figure 1:
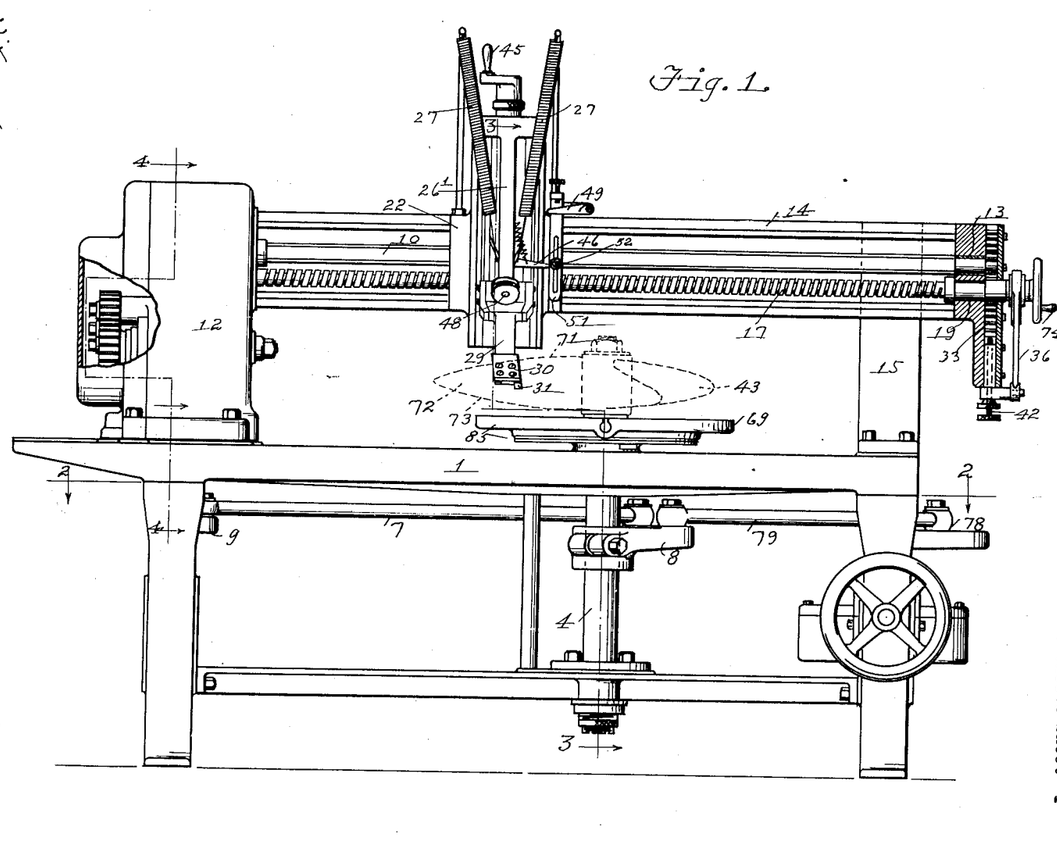
Figure 1 is an elevational front view of a machine for shaping or milling bodies helically, certain parts being shown in vertical section.
Figures 2, 7, 8:
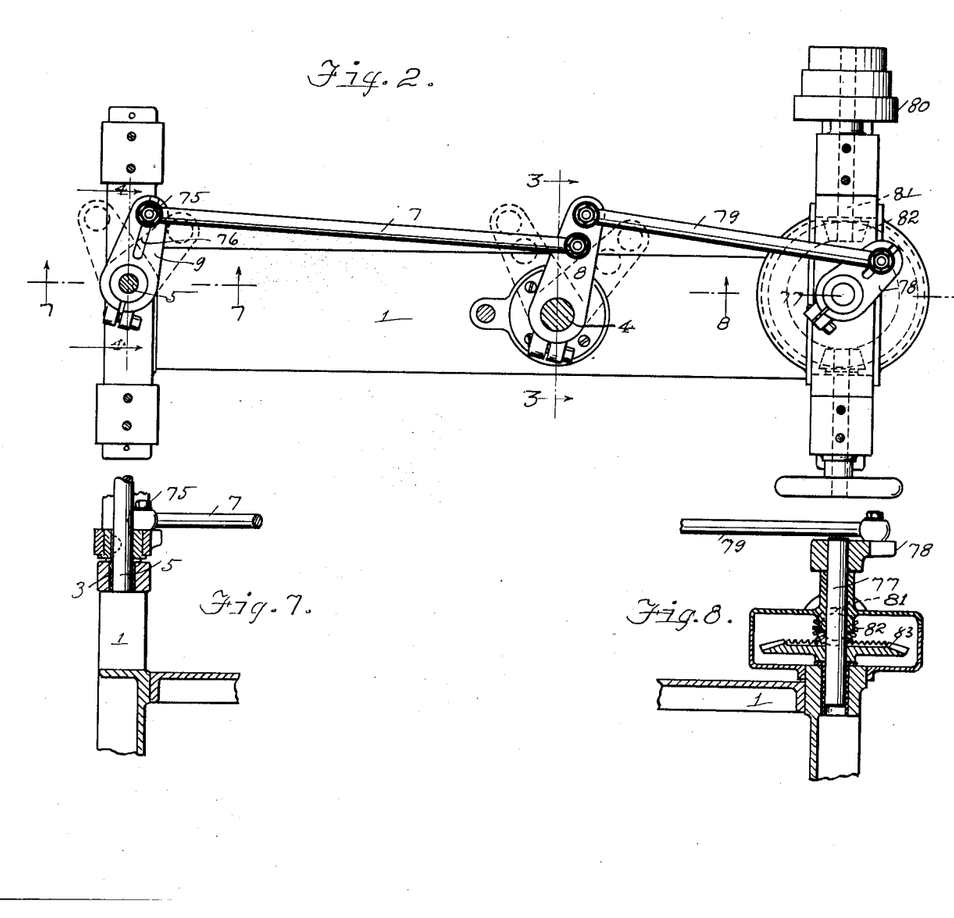
Figure 2 is a horizontal sectional view thereof taken on line 2—2 of Figure 1.
Figure 7 is a vertical sectional view of certain parts taken on line 7—7 of Figure 2.
Figure 8 is a vertical sectional view of certain parts taken on line 8—8 of Figure 2.
Figure 3:
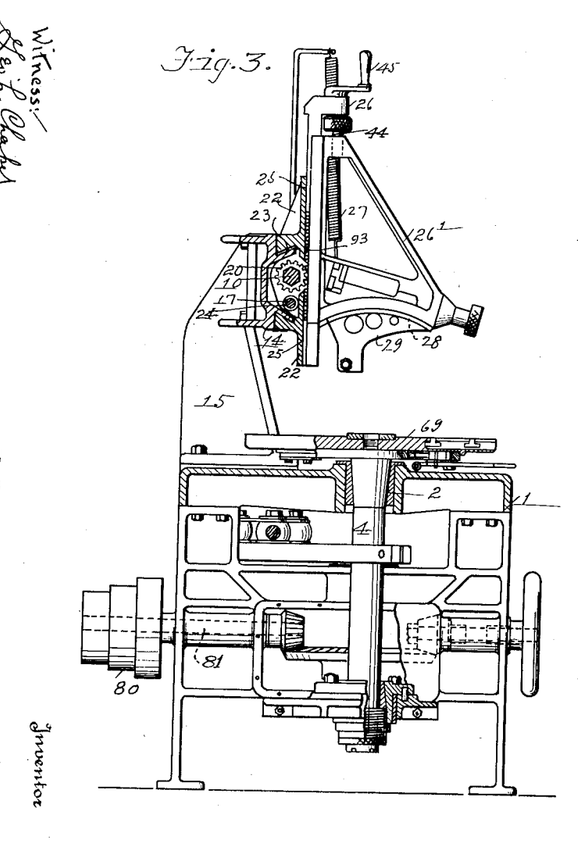
Figure 3 is an elevational left-hand end view of the machine, partially sectioned vertically on line 3—3 of Figures 1 and 2.
Figure 4:
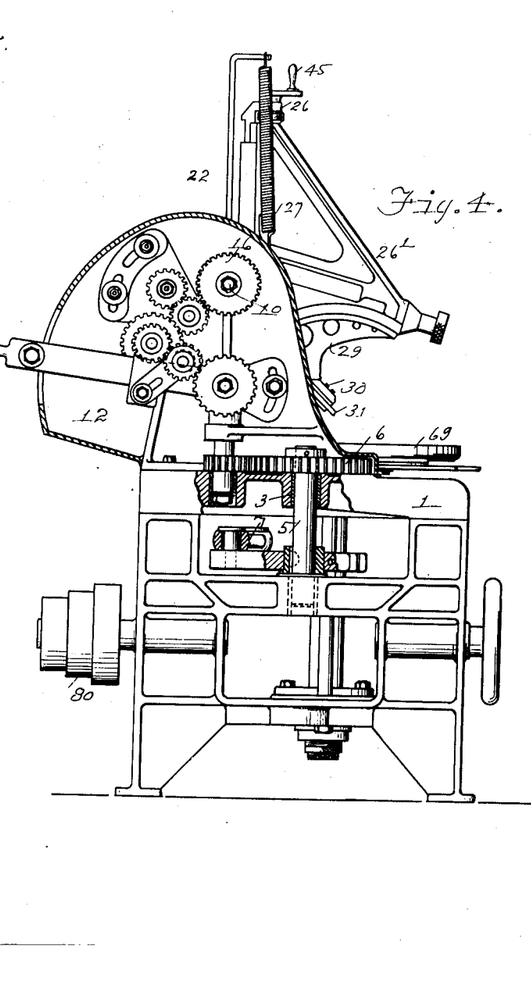
Figure 4 is an elevational left-hand end view thereof, partially sectioned on line 4—4 of Figures 1 and 2.
Figure 5:
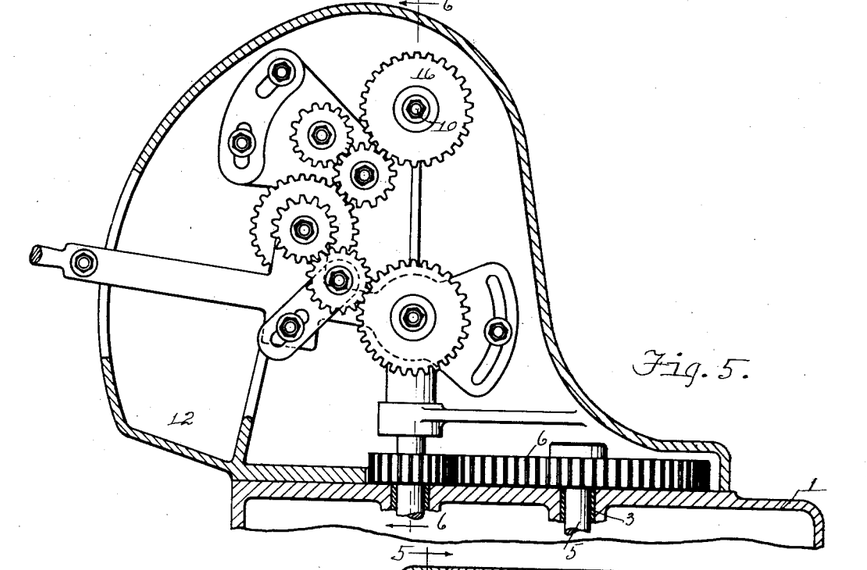
Figure 5 is an elevational view of some of the same parts, and partially sectioned vertically on line 5—5 of Figure 6.
Figure 6:
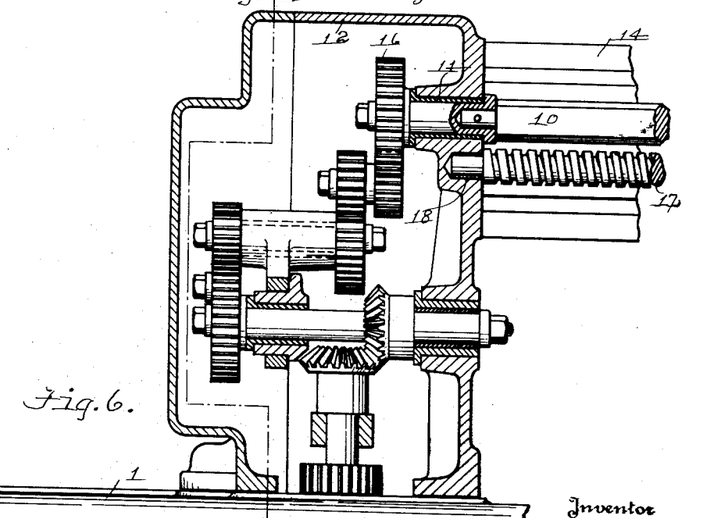
Figure 6 is a vertical sectional view thereof taken on line 6—6 of Figure 5.
Figure 9:
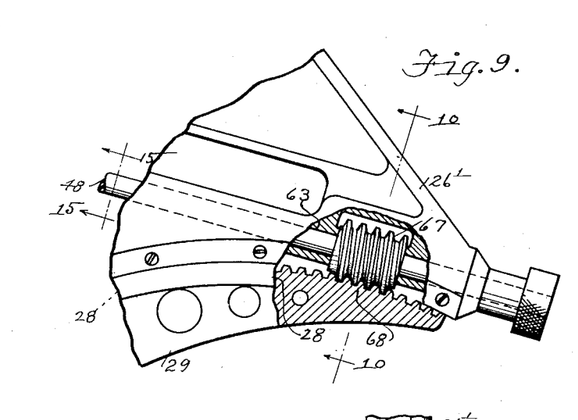
Figure 9 is a fragmentary elevational view of tool-carrying parts shown partially in longitudinal section.
Figure 10:
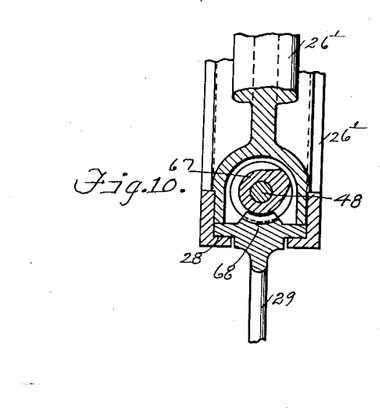
Figure 10 is a transverse sectional view thereof taken on line 10—10 of Figure 9.
Figure 11:
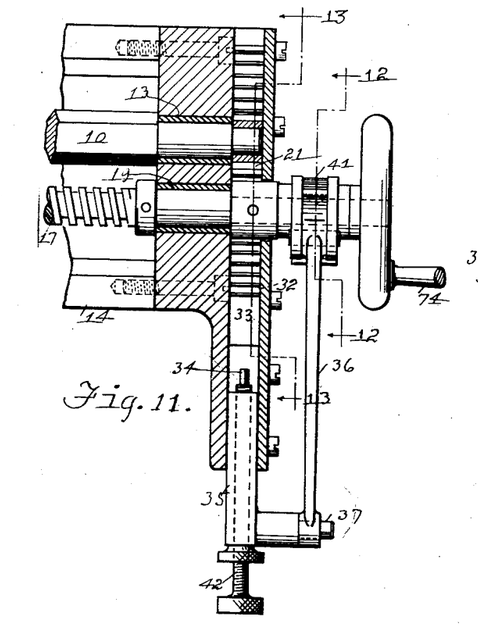
Figure 11 is an elevational view of certain parts seen at the right-hand upper corner of Figure 1 and partially sectioned on the same vertical plane.

On the frame 1 of the illustrated machine are journalled at 2 and 3 respectively the vertical shaft 4 having at its upper end the work carrier designated generally 69 and the vertical shaft 5 having at its upper end a gear 6. These shafts are connected, to rockingly turn or oscillate together, by the rod 7 pivoted on their respective crank arms 8, 9. In Figures 1 and 2 these shafts and their crank arms are shown at an intermediate position in their turning movement, extreme positions of such movement being indicated in dotted lines in Figure 2.

Figure 20:
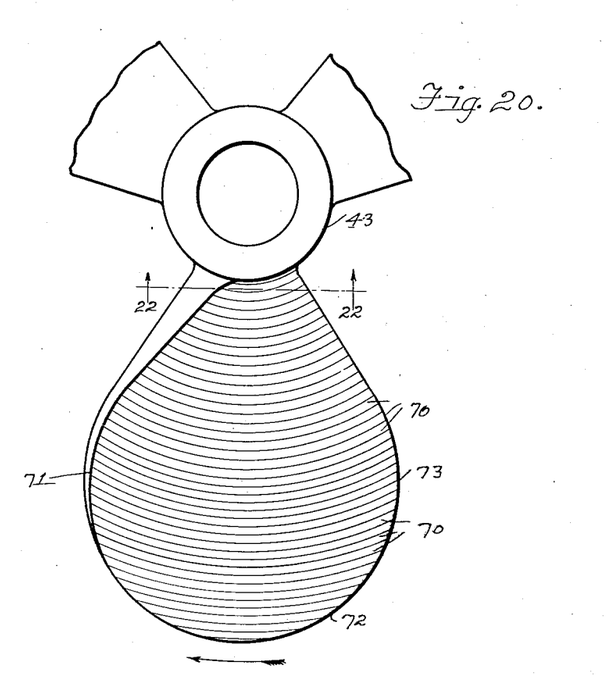
Figure 20 is a top plan view of a work piece— a screw propeller—showing the successive cuts of the machine's tool thereon.
Figure 21:
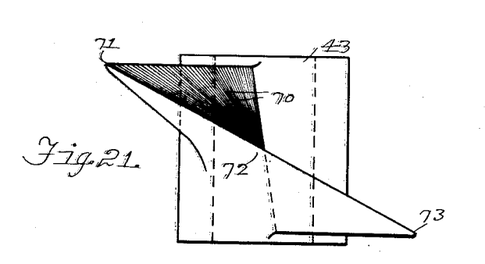
Figure 21 is an edgewise view thereof.
Figure 22:
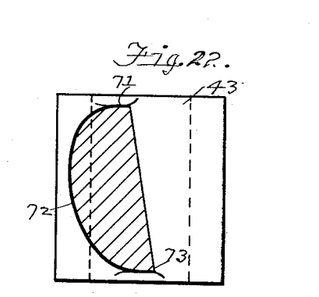
Figure 22 is a sectional view of the same taken on line 22—22 of Figure 20.

The work piece, as the screw propeller 43, is secured by suitable means to the work carrier which is turned by its vertical shaft 4 relatively to the cutting tool 31 while the same is being fed vertically to form a cut winding helically about the axis of the tool carrier and work piece as indicated at 70 in Figures 20, 21. The tool is thus fed in each of its cutting operations by the following mechanism driven by the vertical shaft 5. A horizontally disposed hexagonal rock shaft 10 having a gear 20 slidable therealong and a gear 21 at its outer end is journalled at 11 in the upwardly extending casing member 12 of the frame and at 13 in the outer end of the frame's arm 14 which extends over the work carrier and has a supporting post 15. This shaft 10 is rocked through a suitable train of gears contained in said casing member and including the gear 6 of shaft 5 and the gear 16 of shaft 10.

Disposed parallelly with the rock shaft 10 is the threaded shaft 17 journalled at 18, 19 in said casing member and arm 14. A carriage 22 is movable along the horizontal slide bearing 23 of the arm 14 to position the tool horizontally for its successive operations and has a nut portion or threaded opening 24 in which the threaded shaft 17 intermittently turns to thus move this carriage. Said carriage 22 has a vertical slide bearing 25 along which a second carriage 26 is movable, its weight being supported by the springs 27. This second carriage 26 has a rack portion 93 with which gear 20 meshes to move the same, and has a forwardly extending member $26^1$ slidable vertically thereon to adjusted positions by a screw 44 having a handle 45.

This second carriage 26 (i. e. its said member $26^1$) has a bearing 28 curved in a vertical plane disposed at right angles to the direction of the arm 14. A tool carrier 29 is movable in bearing 28 and has suitable means 30 for mounting the cutting tool 31 thereon. The outer end of the arm 14 has a vertical slide bearing 32 in which moves a rack bar 33 with which meshes the gear 21 of rock shaft 10.

Assuming now the work carrier and work piece thereon to be turning in the direction indicated by the curved arrow in Figure 20, and the carriage 22 and tool 31 to be at the left-hand side of the axis of the work carrier as shown in Figure 1 and the tool to be raised to begin its operation at the upper edge 71 of the blade 72 of the propeller work piece, the shaft 10 is turned by the turning of shaft 5 (through said train of gears and simultaneously with shaft 4 and said work piece) to feed, by gear 20, the carriage 26 and parts carried thereby downwardly and thus cut said blade in a helical direction from its upper edge 71 to its lower edge 73.

This cutting operation having been finished the parts are moved by the reverse turning movement of shafts 4 and 5 to position the work piece and the tool for the next cutting operation.

Figure 13:
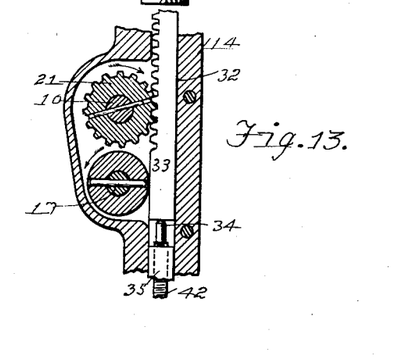
Figure 13 is a vertical sectional view of the same taken on line 13—13 of Figure 11.
Figure 14:
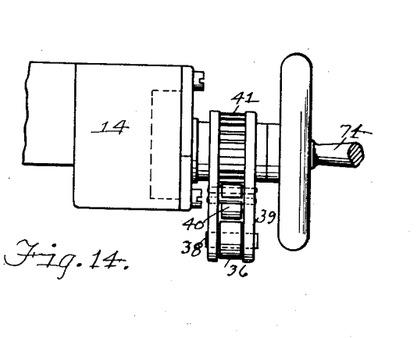
Figure 14 is a top plan view thereof.
Figure 15:
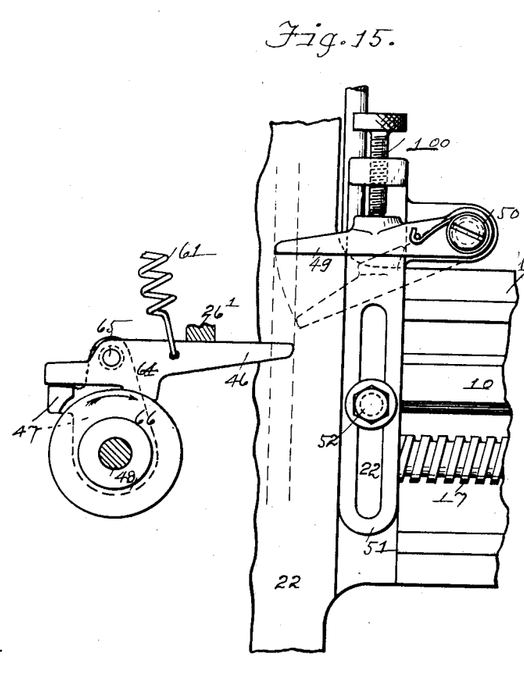
Figure 15 is an elevational front view of certain parts, a shaft being shown sectioned on line 15—15 of Figure 9.

In this reverse movement the shaft 10 raises the carriage 26 with the parts carried thereby, and the gear 21 is turned in the direction indicated by the curved arrow in Figure 13 thus causing the rack bar 33 to move down and engage the upper end 34 of a length-adjusting rod 42 threaded in a bar 35 slidable in said bearing 32, and move said bar down against the pressure of spring 53 so that the link 36, pivoted at 37 on bar 35 and at 38 on the arm 39 turnable on the shaft 17, turns this arm causing its pawl 40 to engage the teeth of the ratchet wheel 41 on shaft 17 thus rotating said shaft a part revolution to move the carriage 22 toward the right-hand side of Figure 1 for the tool's said next cutting operation. Thereupon the turning of shafts 4, 5 is again reversed so that they turn in the direction of the first cutting operation, thus making a second cut horizontally next to the cut made by the first operation. These operations are repeated by the oscillating movements of shafts 4, 5 until a continuous series of said cuts (as shown at 70 in Figure 20) is formed extending from the outer end of the blade of the propeller to its hub portion. Such series being completed, the threaded shaft 17 is turned reversely by its crank 74 to move the carriages back to the left-hand side of Figure 1, and the screw 44 is turned by its handle 45 to lower member $26^1$ and the tool sufficiently to form a second series of cuts like the first series, thus deepening the same. These operations are repeated until said propeller blade is finished, whereupon the propeller work piece 43 is turned to another angular position about the axis of shaft 4 for the forming of another blade of the propeller.

In order to so form the faces of the propeller blades that their angular inclination relatively to planes at right angles to the propeller's axis may be increasingly obtuse toward said axis, the cutting tool is correspondingly inclined, step by step between its cutting operations, by the following means: The upward movement of the second carriage 26 carries the finger 46 of a friction pawl 64 pivoted at 65 on a member 47, turnably surrounding a shaft 48 which bears at 63 in member $26^1$ of said carriage, into engagement with the lever stop 49 pivoted at 50 on a vertically adjustable bar 51 carried by a set screw 52 on the first carriage 22. This movement turns the pawl downwardly into sufficient pressure on the periphery of a wheel 66, tight on shaft 48, to turn said shaft. This shaft has a worm portion 67 meshing with the toothed segment 68 of the the tool carrier 29 so that this turning movement of said shaft and worm moves the tool carrier in the curved bearing 28 to incline the tool 31 to an angle more obtuse to the horizontal. When the carriage 26 and parts carried thereby move down the spring 61 releases said pressure and turns members 46 and 47 back. The degree of the tool's said inclination may be varied by moving the bar 51 to vertically adjusted positions or by turning the set screw 100.

Figure 12:
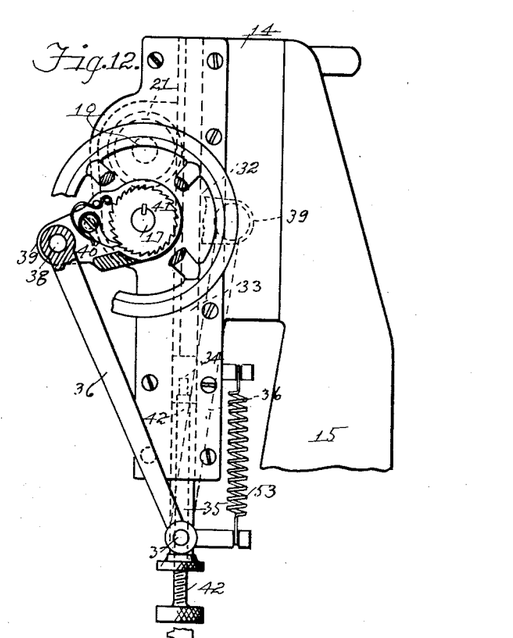
Figure 12 is a vertical sectional view thereof taken on line 12—12 of Figure 11.

To provide an oppositely winding helical formation, the wheel 41, link 36 and arm 39 may be removed from the position shown in solid lines in Figure 12 and applied at the opposite side of shafts 10, 17 (the arm and link being then in the dotted line position shown in said view) whereupon the shaft 17 will be turned oppositely, the turning movement of shaft 10 remaining as before.

Means for varying the relative movements of the parts may be adopted. The screw rod 42 may be turned to govern the degree of the turning movement of shaft 17; the pivotal connection 75 of rod 7 with crank arm 9 of shaft 5 may be moved in its slot 76 to vary the relative movement of shafts 4 and 5; the gears of the train in casing member 12 may be replaced by others of different diameters in the well known manner.

The vertical shafts 4, 5 may be oscillated by various means, as the rotating shaft 77 having a crank arm 78 connected by rod 79 with crank arm 8 and driven by the pulley 80 on shaft 81 having a gear 82 meshing with gear 83 on shaft 77.

It will be seen that the shafts 4, 5 turn in one direction to effect the cutting operation of the tool, and in the opposite direction to position the parts for the succeeding cutting operation.

Figure 16:
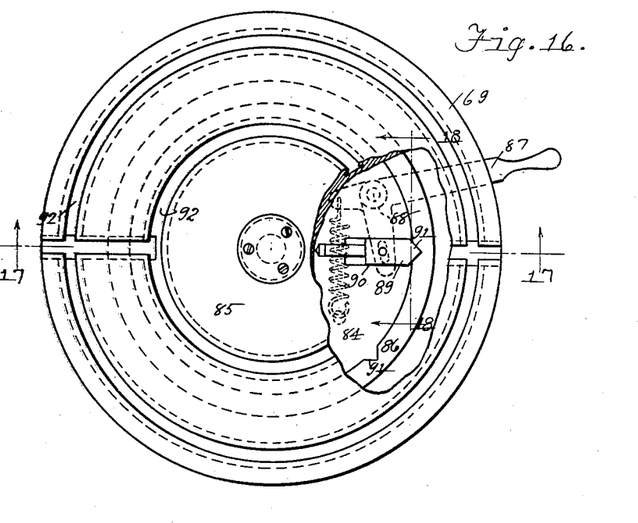
Figure 16 is a top plan view of a work carrier.
Figure 17:
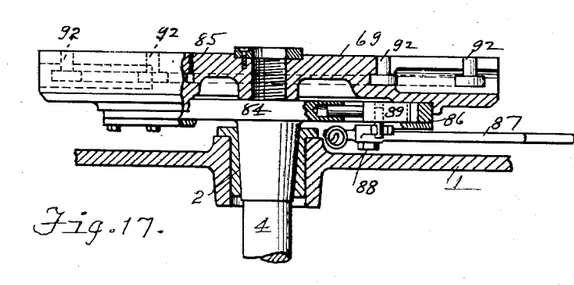
Figure 17 is a vertical sectional view thereof taken on line 17—17 of Figure 16.
Figure 18:
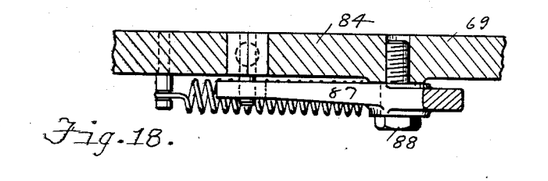
Figure 18 is a vertical sectional view of the same taken on line 18—18 of Figure 16.
Figure 19:
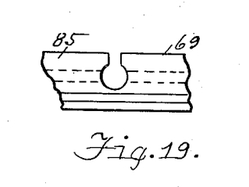
Figure 19 is a fragmentary edgewise view of the work carrier.

The work carrier 69 as shown in Figures 16, etc. comprises a circular disk 84 non-turnably secured on the upper end of shaft 4, and a circular table 85 above said disk having a ring 86 in which the edge of the disk bears turnably. This disk has on its under side a lever handle 87 fulcrumed at 88 thereon and connected with a latch bar 89 slidable at 90 in the disk into engagement with notches 91 in the ring so that the table may be releasably connected to the disk to turn therewith and with the shaft 4. Circular channels 92 in the table are adapted to receive the headed lower ends of threaded bolts (not shown) for clamping the work piece on the table. When one of the propeller blades is shaped by the machine, the table may be turned on the disk to position another blade for shaping by the tool.

By reversing the movements of some of the parts, the machine may be made to cut the propeller blades from their lower edges 73 to their upper edges 71.

The invention being intended to be pointed out in the claims, is not to be limited to or by details of construction of the particular embodiment thereof illustrated by the drawings or hereinbefore described.

I claim:

1. A machine for shaping a body helically, comprising: a base frame having a horizontal arm; a carrier for the body mounted on the frame beneath the arm for oscillating turning movement about a vertical axis; a horizontal rock shaft mounted on the arm and having a splined gear; a horizontal threaded shaft mounted on the arm; a carriage horizontally movable on the arm in threaded relation with the second-mentioned shaft; a tool carried by the hereinafter-mentioned carriage; a carriage vertically movable on the first-mentioned carriage and having a rack meshing with the gear for moving the tool operatively by movements of the rock shaft whereby the body turning with the carrier in one direction is cut helically about said axis in successive cuts side by side; means for simultaneously turning the carrier in its said direction and turning the rock shaft to move the tool operatively; and means for turning the threaded shaft to move the carriages and the tool horizontally and for reversely turning the rock shaft and the carrier, the second-mentioned means operating between the operative movements of the tool.

2. A machine for shaping a body helically, comprising: a base frame having a horizontal arm; a carrier for the body mounted on the frame beneath the arm for oscillating turning movement about a vertical axis; a horizontal rock shaft mounted on the arm and having a splined gear; a horizontal threaded shaft mounted on the arm; a carriage horizontally movable on the arm in threaded relation with the second-mentioned shaft; a tool carried by the hereinafter-mentioned carriage; a carriage vertically movable on the first-mentioned carriage and having a rack meshing with the gear for moving the tool operatively by movements of the rock shaft whereby the body turning with the carrier in one direction is cut helically about said axis in successive cuts side by side; means for simultaneously turning the carrier in its said direction and turning the rock shaft to move the tool operatively; means for turning the threaded shaft to move the carriages and the tool horizontally and for reversely turning the rock shaft and the carrier, the second-mentioned means operating between operative movements of the tool; a shaft mounted on the frame for oscillating turning movement with the carrier; and means operable by the movement of the last-mentioned shaft for rocking the rock shaft.

3. A machine for shaping a body helically, comprising: a base frame having a horizontal arm; a carrier for the body mounted on the frame beneath the arm for oscillating turning movement about a vertical axis; a horizontal rock shaft mounted on the arm and having a splined gear; a horizontal threaded shaft mounted on the arm; a carriage horizontally movable on the arm in threaded relation with the second-mentioned shaft; a tool carried by the hereinafter-mentioned carriage; a carriage vertically movable on the first-mentioned carriage and having a rack meshing with the gear for moving the tool operatively by movements of the rock shaft whereby the body turning with the carrier in one direction is cut helically about said axis in successive cuts side by side; means for simultaneously turning the carrier in its said direction and turning the rock shaft to move the tool operatively; means for turning the threaded shaft to move the carriages and the tool horizontally and for reversely turning the rock shaft and the carrier, the second-mentioned means operating between operative movements of the tool; a shaft mounted on the frame for oscillating turning movement with the carrier; and a train of gears intermediate the last-mentioned shaft and the rock shaft.

4. A machine for shaping a body helically, comprising: a base frame having a horizontal arm; a carrier for the body mounted on the frame beneath the arm for oscillating turning movement about a vertical axis; a horizontal rock shaft mounted on the arm having a splined gear; a horizontal threaded shaft mounted on the arm having a ratchet wheel; a carriage horizontally movable on the arm in threaded relation with the second-mentioned shaft; a tool vertically movable operatively on the carriage by movements of the rock shaft and having a connected rack meshing with said gear, whereby the body turning with the carrier in one direction is cut helically about said axis in successive cuts side by side; means for simultaneously turning the carrier in its said direction and turning the rock shaft to move the tool operatively; and means for reversely turning the rock shaft and the carrier; a pawl actuated by the rock shaft engaging the ratchet wheel to turn the threaded shaft and move the tool horizontally, the second-mentioned means and pawl operating between operative movements of the tool.

5. A machine for shaping a body helically, comprising: a base frame having a horizontal arm; a carrier for the body mounted on the frame beneath the arm for oscillating turning movement about a vertical axis; a carriage movable horizontally on the arm; a carriage movable vertically on the first-mentioned carriage and having a tool-carrying member turnable thereon about an axis parallel with the arm; a tool carried by said member movable thereby to positions inclined relatively to a horizontal plane; means for simultaneously turning the carrier and moving the second-mentioned carriage and the tool operatively; means for moving the carriages and the tool horizontally, turning the tool-carrying member, reversely moving the second-mentioned carriage and reversely turning the carrier, said means operating between operative movements of the tool.

6. A machine for shaping a body helically, comprising: a base frame having a horizontal arm; a carrier for the body mounted on the frame beneath the arm for oscillating turning movement about a vertical axis; a carriage movable horizontally on the arm; a carriage movable vertically on the first-mentioned carriage and having a tool-carrying member turnable thereon about an axis parallel with the arm and having a toothed segment; a tool carried by said member movable thereby to positions inclined relatively to a horizontal plane; means for simultaneously turning the carrier and moving the second-mentioned carriage and the tool operatively; means for moving the carriages and the tool horizontally in one direction, turning the tool-carrying member, reversely moving the second-mentioned carriage and reversely turning the carrier, said means operating between operative movements of the tool, and including a worm shaft journalled on the tool-carrying member and meshing with the segment and a pawl moved to turning engagement with the shaft by the reverse movement of the second-mentioned carriage.

7. A machine for shaping a body helically, comprising: a base frame having a horizontal arm; a carrier for the body mounted on the frame beneath the arm for oscillating turning movement about a vertical axis; a horizontal rock shaft mounted on the arm and having a splined gear; a horizontal threaded shaft mounted on the arm; a carriage horizontally movable on the arm in threaded relation with the second-mentioned shaft; a carriage vertically movable on the first-mentioned carriage and having a rack meshing with the gear for moving the hereinafter-mentioned tool operatively by movements of the rock shaft whereby the body turning with the carrier in one direction is cut helically about said axis in successive cuts side by side, the second-mentioned carriage having a tool-carrying member turnable thereon about an axis parallel with the arm; a tool carried by said member movable thereby to positions inclined relatively to a horizontal plane; means for simultaneously turning the carrier in its said direction and turning the rock shaft to move the tool operatively; means for turning the threaded shaft to move the carriages and the tool horizontally, turning the tool-carrying member, reversely moving the second-mentioned carriage and reversely turning the carrier, said means operating between operative movements of the tool.

8. A machine for shaping a body helically, comprising: a base frame having a horizontal arm; a carrier for the body mounted on the frame beneath the arm for oscillating turning movement about a vertical axis; a horizontal rock shaft mounted on the arm and having a splined gear; a horizontal threaded shaft mounted on the arm; a carriage horizontally movable on the arm in threaded relation with the second-mentioned shaft; a carriage vertically movable on the first-mentioned carriage and having a rack meshing with the gear for moving the hereinafter-mentioned tool operatively by movements of the rock shaft whereby the body turning with the carrier in one direction is cut helically about said axis in successive cuts side by side, the second-mentioned carriage having a tool-carrying member turnable thereon about an axis parallel with the arm; a tool carried by said member movable thereby to positions inclined relatively to a horizontal plane; means for simultaneously turning the carrier in its said direction and turning the rock shaft to move the tool operatively; means for turning the threaded shaft to move the carriages and the tool horizontally, turning the tool-carrying member, reversely moving the second-mentioned carriage and reversely turning the carrier, said means operating between operative movements of the tool, the tool being movable vertically independently of said means for moving the same operatively.

JOHN R. WARREN.